United States Patent
Shiao et al.

(10) Patent No.: US 9,115,498 B2
(45) Date of Patent: Aug. 25, 2015

(54) ROOFING COMPOSITE INCLUDING DESSICANT AND METHOD OF THERMAL ENERGY MANAGEMENT OF A ROOF BY REVERSIBLE SORPTION AND DESORPTION OF MOISTURE

(71) Applicants: Ming Liang Shiao, Collegeville, PA (US); Sam Yuan, Lansdale, PA (US); Murray S. Toas, Norristown, PA (US); Gregory F. Jacobs, Oreland, PA (US)

(72) Inventors: Ming Liang Shiao, Collegeville, PA (US); Sam Yuan, Lansdale, PA (US); Murray S. Toas, Norristown, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 13/799,863

(22) Filed: Mar. 13, 2013

(65) Prior Publication Data
US 2013/0263530 A1    Oct. 10, 2013

Related U.S. Application Data

(60) Provisional application No. 61/617,955, filed on Mar. 30, 2012, provisional application No. 61/651,094, filed on May 24, 2012.

(51) Int. Cl.
| | |
|---|---|
| *E04B 7/00* | (2006.01) |
| *E04B 1/70* | (2006.01) |
| *E04B 5/00* | (2006.01) |
| *E04B 1/00* | (2006.01) |

(Continued)

(52) U.S. Cl.
CPC ............ *E04D 13/1612* (2013.01); *E04D 13/16* (2013.01); *E04D 12/002* (2013.01); *Y02B 10/20* (2013.01); *Y02E 10/40* (2013.01)

(58) Field of Classification Search
CPC ...... B01D 53/261; Y02B 10/20; Y02B 10/12; Y02E 10/40; E04D 13/1612; E04D 13/16
USPC ........ 52/302.3, 302.6, 198, 408–413, 746.11, 52/95
See application file for complete search history.

(56) References Cited

U.S. PATENT DOCUMENTS

| 1,728,837 A | 9/1929 | Slayter |
| 2,041,696 A | 5/1936 | Codwise |
| 2,076,989 A * | 4/1937 | Andres et al. .................. 52/537 |

(Continued)

FOREIGN PATENT DOCUMENTS

| CA | 2367996 A1 | 10/2000 |
| DE | 4219728 A1 | 11/1992 |

(Continued)

OTHER PUBLICATIONS

CertainTeed Specification Sheet "MemBrain™, The SMART Vapor Retarder" Mar. 2008.

(Continued)

*Primary Examiner* — Phi A
*Assistant Examiner* — Omar Hijaz
(74) *Attorney, Agent, or Firm* — Abel Law Group, LLP; Alexander H. Plache

(57) ABSTRACT

A roof system is secured to a roof deck on a building. The roof system has a thermal energy absorbing product including a desiccant located between the roof deck and a roof barrier. The desiccant reversibly absorbs moisture, and in response thereto, heat is released and absorbed by the desiccant to effect a thermal management of the roof system.

20 Claims, 10 Drawing Sheets

(51) Int. Cl.
*E04D 13/16* (2006.01)
*E04D 12/00* (2006.01)

(56) References Cited

U.S. PATENT DOCUMENTS

| | | |
|---|---|---|
| 2,138,690 A | 11/1938 | Altenkirch |
| 2,887,426 A | 5/1959 | Knold |
| 3,167,159 A | 1/1965 | Bovenkerk |
| 3,169,927 A | 2/1965 | Ladislac |
| 3,627,566 A | 12/1971 | Stichter et al. |
| 4,057,071 A | 11/1977 | Rhodes |
| 4,074,480 A | 2/1978 | Burton |
| 4,101,700 A | 7/1978 | Ray, Jr. et al. |
| 4,138,850 A | 2/1979 | Tchernev |
| 4,182,681 A | 1/1980 | Gumbert |
| 4,189,878 A | 2/1980 | Fitzgerald |
| 4,214,510 A | 7/1980 | Ward |
| 4,221,096 A | 9/1980 | Viertlboeck |
| 4,284,674 A | 8/1981 | Sheptak |
| 4,286,210 A | 8/1981 | Ignatjev |
| 4,289,980 A | 9/1981 | McLaughlin |
| 4,421,581 A * | 12/1983 | Olsen ............................. 156/71 |
| 4,432,956 A | 2/1984 | Zarzycki et al. |
| 4,442,242 A | 4/1984 | Fogelberg |
| 4,482,010 A | 11/1984 | Cordon |
| 4,555,447 A | 11/1985 | Sieloff et al. |
| 4,564,547 A | 1/1986 | Hughes |
| 4,572,864 A | 2/1986 | Benson et al. |
| 4,645,519 A | 2/1987 | Fraioli et al. |
| 4,776,262 A | 10/1988 | Curran |
| 4,786,301 A | 11/1988 | Rhodes |
| 4,846,293 A | 7/1989 | Li |
| 4,847,148 A | 7/1989 | Schirmer |
| 4,870,535 A | 9/1989 | Matsumoto |
| 4,882,485 A | 11/1989 | Duryea |
| 4,913,942 A | 4/1990 | Jick |
| 4,924,645 A | 5/1990 | Abeln |
| 4,930,285 A | 6/1990 | Ward |
| 4,948,766 A | 8/1990 | Talmy et al. |
| 5,126,401 A | 6/1992 | Chou |
| 5,222,375 A | 6/1993 | Conrad et al. |
| 5,236,754 A | 8/1993 | McBride et al. |
| 5,351,415 A | 10/1994 | Brooks et al. |
| 5,385,678 A | 1/1995 | Witt |
| 5,397,631 A | 3/1995 | Green et al. |
| 5,418,068 A | 5/1995 | Caluori et al. |
| 5,418,257 A | 5/1995 | Weisman |
| 5,466,504 A | 11/1995 | Gavin et al. |
| 5,508,072 A | 4/1996 | Andersen et al. |
| 5,527,570 A | 6/1996 | Addeo et al. |
| 5,535,945 A | 7/1996 | Sferrazza |
| 5,539,598 A | 7/1996 | Denison |
| 5,554,238 A | 9/1996 | English |
| 5,650,030 A | 7/1997 | Kyricos |
| 5,683,772 A | 11/1997 | Andersen et al. |
| 5,683,810 A | 11/1997 | Babbitt et al. |
| 5,685,897 A * | 11/1997 | Belding et al. .................. 96/154 |
| 5,761,864 A | 6/1998 | Nonoshita |
| 5,770,295 A | 6/1998 | Alderman |
| 5,837,064 A | 11/1998 | Bowers |
| 5,875,835 A | 3/1999 | Shramo et al. |
| 5,877,257 A | 3/1999 | Fetell |
| 5,885,475 A | 3/1999 | Salyer |
| 5,890,372 A | 4/1999 | Belding et al. |
| 5,898,559 A | 4/1999 | Smith |
| 5,947,646 A | 9/1999 | Lytle |
| 5,949,635 A | 9/1999 | Botez |
| 5,972,254 A | 10/1999 | Sander |
| 5,987,833 A | 11/1999 | Heffelfinger et al. |
| 6,003,327 A | 12/1999 | Belding et al. |
| 6,012,263 A | 1/2000 | Church et al. |
| 6,092,375 A | 7/2000 | Denniston |
| 6,105,335 A | 8/2000 | Vohra |
| 6,122,477 A | 9/2000 | Parker |
| 6,150,945 A | 11/2000 | Wilson |
| 6,155,020 A | 12/2000 | Deem |
| 6,199,388 B1 | 3/2001 | Fischer, Jr. |
| 6,253,530 B1 * | 7/2001 | Price et al. .................. 52/793.1 |
| 6,262,164 B1 | 7/2001 | Church et al. |
| 6,308,482 B1 * | 10/2001 | Strait ............... 52/408 |
| 6,329,052 B1 | 12/2001 | Groh et al. |
| 6,355,333 B1 | 3/2002 | Waggoner et al. |
| 6,419,171 B1 | 7/2002 | Takayanagi |
| 6,503,026 B1 | 1/2003 | Mitchell |
| 6,507,473 B2 | 1/2003 | Richie et al. |
| 6,638,984 B2 | 10/2003 | Soane et al. |
| 6,645,598 B2 | 11/2003 | Alderman |
| 6,793,713 B2 | 9/2004 | Kretsinger et al. |
| 6,808,772 B2 | 10/2004 | Kunzel et al. |
| 6,858,068 B2 | 2/2005 | Smith et al. |
| 6,864,297 B2 | 3/2005 | Nutt et al. |
| 6,878,455 B2 | 4/2005 | Kunzel et al. |
| 6,890,666 B2 | 5/2005 | Kunzel et al. |
| 6,902,611 B2 | 6/2005 | Muris-Trevino |
| 6,938,386 B2 * | 9/2005 | Ritland et al. .................. 52/408 |
| 6,946,182 B1 | 9/2005 | Allgeuer et al. |
| 6,949,289 B1 | 9/2005 | Lawton et al. |
| 7,104,077 B2 | 9/2006 | Yabu et al. |
| 7,127,858 B2 | 10/2006 | Layfield |
| 7,135,424 B2 | 11/2006 | Worley et al. |
| 7,442,659 B2 | 10/2008 | Moll |
| 7,501,011 B2 | 3/2009 | Powers et al. |
| 7,504,346 B2 | 3/2009 | Stepanian et al. |
| 7,718,252 B2 | 5/2010 | Ito et al. |
| 7,732,372 B2 | 6/2010 | Hampden-Smith et al. |
| 7,797,950 B2 | 9/2010 | Brower et al. |
| 7,838,123 B2 | 11/2010 | Chen et al. |
| 7,914,634 B2 | 3/2011 | Moll |
| 8,034,740 B2 | 10/2011 | Kitahata et al. |
| 8,448,408 B2 * | 5/2013 | Kalwara ..................... 52/746.11 |
| 2002/0010295 A1 | 1/2002 | Nishida |
| 2002/0048552 A1 | 4/2002 | Garrill et al. |
| 2002/0147242 A1 | 10/2002 | Salyer et al. |
| 2002/0168535 A1 | 11/2002 | Prosperio |
| 2003/0014982 A1 | 1/2003 | Smith et al. |
| 2003/0033829 A1 | 2/2003 | Smith et al. |
| 2003/0087576 A1 | 5/2003 | Yang et al. |
| 2003/0109910 A1 | 6/2003 | Lachenbruch et al. |
| 2003/0109911 A1 | 6/2003 | Lachenbruch et al. |
| 2003/0205129 A1 | 11/2003 | Kretsinger et al. |
| 2003/0215609 A1 | 11/2003 | Burkart |
| 2004/0056054 A1 | 3/2004 | Ottolangui |
| 2004/0060444 A1 * | 4/2004 | Smith et al. ..................... 96/108 |
| 2004/0072486 A1 | 4/2004 | Moll |
| 2004/0076826 A1 | 4/2004 | Lee |
| 2004/0103603 A1 | 6/2004 | Kunzel |
| 2004/0118506 A1 | 6/2004 | Dong |
| 2004/0134137 A1 * | 7/2004 | Geer et al. ........................ 52/95 |
| 2004/0211315 A1 * | 10/2004 | Kretsinger et al. ............. 95/117 |
| 2004/0224144 A1 | 11/2004 | Saari et al. |
| 2005/0000183 A1 | 1/2005 | Fay |
| 2005/0011141 A1 | 1/2005 | Corwin |
| 2005/0025925 A1 | 2/2005 | O'Connor |
| 2005/0079352 A1 | 4/2005 | Glorioso et al. |
| 2005/0140041 A1 * | 6/2005 | Seth ............................... 264/75 |
| 2006/0000155 A1 | 1/2006 | Wagner |
| 2006/0165885 A1 | 7/2006 | Fay |
| 2006/0191223 A1 * | 8/2006 | Bontrager, II ................... 52/411 |
| 2006/0257639 A1 | 11/2006 | Bianchi et al. |
| 2006/0264133 A1 | 11/2006 | Krajewski et al. |
| 2006/0283135 A1 | 12/2006 | Fellinger et al. |
| 2007/0015424 A1 | 1/2007 | Toas et al. |
| 2007/0110986 A1 * | 5/2007 | Eisenberg ................. 428/304.4 |
| 2007/0125115 A1 | 6/2007 | Matsui et al. |
| 2007/0137139 A1 * | 6/2007 | Tierney et al. ................ 52/748.1 |
| 2007/0234649 A1 | 10/2007 | Near et al. |
| 2008/0020143 A1 | 1/2008 | Moll |
| 2008/0020206 A1 | 1/2008 | Fay |
| 2008/0236078 A1 | 10/2008 | Toas |
| 2009/0025711 A1 * | 1/2009 | Edwards et al. .............. 126/704 |
| 2009/0071088 A1 | 3/2009 | Viegas et al. |
| 2009/0173376 A1 * | 7/2009 | Spencer et al. .............. 136/248 |
| 2010/0015430 A1 | 1/2010 | Hartmann et al. |
| 2010/0107550 A1 * | 5/2010 | Toas et al. .................. 52/742.12 |

(56) References Cited

U.S. PATENT DOCUMENTS

| | | | |
|---|---|---|---|
| 2010/0170499 A1* | 7/2010 | Bar | 126/635 |
| 2011/0192393 A1* | 8/2011 | Swift et al. | 126/663 |
| 2012/0288674 A1 | 11/2012 | Botke | |
| 2013/0029550 A1* | 1/2013 | Seth et al. | 442/76 |
| 2013/0061846 A1* | 3/2013 | Colson et al. | 126/617 |
| 2013/0125487 A1* | 5/2013 | Power et al. | 52/302.3 |

FOREIGN PATENT DOCUMENTS

| | | |
|---|---|---|
| DE | 19915311 A1 | 4/1999 |
| DE | 202006009620 U1 | 10/2006 |
| EP | 0626255 A1 | 11/1994 |
| EP | 1209298 A1 | 5/2002 |
| EP | 1296002 A2 | 3/2003 |
| JP | 02016043 | 2/1990 |
| JP | 08215001 | 8/1996 |
| JP | 2002172739 A | 6/2002 |
| JP | 2002178444 | 6/2002 |
| WO | 0069624 A1 | 11/2000 |
| WO | 0123125 A2 | 4/2001 |
| WO | 02070251 A1 | 9/2002 |
| WO | 2008021145 A1 | 2/2008 |
| WO | 2008121716 A2 | 10/2008 |
| WO | 2010008910 A9 | 1/2010 |
| WO | 2011130657 A2 | 10/2011 |

OTHER PUBLICATIONS

International Search Report and Written Opinion mailed Dec. 14, 2010 with regard to International Application No. PCT/US2010/053120.

International Search Report and Written Opinion mailed Nov. 3, 2008 with regard to International Application No. PCT/08/58451.

Y.J. Huang et al. "Residential heating and Cooling Loads Components Analysis" LBNL-44636, Lawrence Berkeley national Laboratory, Berkley California (1999).

Florida Solar Energy Center, 1992, "FSEC 3.0 User's Manual" FSEC-GP-47-92.

Kerestecioglu, A., S. Swami; 1990, "Theoretical and Computational Investigation of Simultaneous Heat and Moisture Transfer in Buildings: Effective Penetration Depth Theory" ASHRAE Winter Meeting, Atlanta, GA, pp. 447-454.

Changes of Phase (or State) http://id.mind.net/~mstm/physics/mechanics/energy/heatAndTemperature/changesOfP . . . , website accessed May 6, 2004, 4 pages.

"Phase Change Drywall", U.S. Department of Energy, Office of Energy Efficiency and Renewable Energy, Consumer Energy Information: EREC Reference Briefs, Aug. 2002, 5 pages.

"Phase Change Materials for Solar Heat Storage," U.S. Department of Energy, Office of Energy Efficiency and Renewable Energy, Consumer Energy Information: EREC Reference Briefs, Mar. 2003, p. 6.

Rubitherm RT 26, Phase Change Material Based on n-Paraffins and Waxes, Innovative PCM's and Thermal Technology Product Information , Rubitherm GmbH, Jun. 20, 2002, 2 pages.

Rubitherm RT 20, Phase Change Material Based on n-Paraffins and Waxes, Innovative PCM's and Thermal Technology Product Information , Rubitherm GmbH, Aug. 9, 2002, 2 pages.

Rubitherm RT 27, Phase Change Material Based on n-Paraffins and Waxes, Innovative PCM's and Thermal Technology Product Information , Rubitherm GmbH, Jun. 20, 2002, 2 pages.

Rubitherm PX, Latent Heat Powder based on Paraffin and Waxes, Innovative PCM's and Thermal Technology Product Information, Rubitherm GmbH, Jul. 31, 2002, 2 pages.

Rubitherm GR, Latent Heat Granulate Based on Paraffin and Waxes, Innovative PCM's and Thermal Technology Product Information, Rubitherm GmbH, Jul. 31, 2002, 2 pages.

PCM Thermal Solutions, Thermal Management Through the Use of Phase Change Materials (PCM's) TEAP Energy TEA PCM Capsules, http://www.pcm-solutions.com/tea29.html, website accessed Apr. 12, 2004.

TH 29 C Phase Change Material (PCM), TEAP Energy, http://www.teappcm.com/teap_29chtml, website accessed Apr. 13, 2004.

Monthly Progress Report No. 6, Contract DE-FG03-86SF16308, covering Nov. 1986, DOE Solar Passive Division, University, University of Dayton Research Institute's investigation of PCM's.

Salyer, Ival O. et al., "Advanced Phase Change Materials and Systems for Solar Passive Heating and Cooling of Residential Buildings," Final Technical Report Covering the Period of May 29, 1986 through Jul. 15, 1988, University of Dayton Research Institute.

Kedl, R.J., "Conventional Wallboard with Latent Heat Storage for Passive Solar Applications," Oak Ridge National Laboratory, Oak Ridge, TN, pp. 222-225.

Allen et al., "Advances in Microsphere Insulation Systems", CEC C2-C-01, 2003, pp. 1-8.

Carlson, Krista, "Production of Hollow Glass Microspheres from Amber Glass Frit", undated, pp. 1-7.

Rosenbusch and Holcomb, "The Benefit of Microspheres", PCI, 2004, pp. 1-4.

Watkins, Lou, "New Pipeline Insulation Technology [sic] Introduced", Pipeline & Gas Journal, Apr. 2002, pp. 1-2.

Cuming Corp, "Thermal and Insulating Properties of Syntactic Foam", Technical Note 100-5, undated, pp. 1-2.

Hy-Tech Thermal Solutionsm "Ceramic Paint Additive Makes any Paint Insulate", 2003-2004, pp. 1-4.

Expancel, The Products, Applications, Questions & Answers, Trade Literature, Jul. 6, 2006. pp. 1-8.

Rafael Auras, Translation of water vapor transmission values from ASTME E-96-00 to ISO 12572-2001 ( E ), 7 pp Auras Translation values from ASTME96-IS012572-01 Mar. 12, 2005.

Rudd, A.F. and Lstiburek, J.W., "Vented and Sealed Attics in Hot Climates", ASHRAE Symposium on Attics and Cathedral Ceilings, Toronto, Jun. 1997, pp. 1-14.

Abaza, Hussein, "Utilizing Latent Building Thermal Mass for Dehumidification", J. Bldg Physics, vol. 29., No. 1, 37-49 (2004) Abstract, 1 pg.

"Desiccant Chart Comparisons", Sorbent Systems, 2006, pp. 1-4.

"Construction Details Insulating System, Residential Attic Spaces", Owens Corning, Aug. 1997, 4 pp.

"Energy Efficiency in Remodeling: Roofs & Ceilings", Toolbase Services, 2001-2006, pp. 1-6.

"Bulk Desiccant", AGM Container Controls, Inc., Oct. 31, 2006, pp. 1-3.

Gu, L., J.E. Cummungs, M.V. Swami & P.W. Fairey, "Comparison of Duct Computer Models That Could Provide Input to the Proposed Thermal Distribution Standard Method of Test", Symposium of 1998 ASHRAE Winter Meeting, San Francisco, 1998, pp. 1-11.

Gu, L., J.E. Cummings, M.V. Swami & P.W. Fairey 2003, "System Interactions in Forced-Air Heating and Cooling Systems, Part I: Equipment Efficiency Factors," CH-03-7-1 (RP-1165), ASHRAE Transactions 10-(1), pp. 475-484.

Gu, L., J.E. Cummings, M.V. Swami & P.W. Fairey 2003. "Systems Interactions in Forced-Air Heating and Cooling Systems, Part II: Continuous Fan Operation," KC-03-01 (RP-1165), ASHRAE Transactions 109 (2), pp. 371-379.

Lixing Gu "Contract Report: Examine Potential Energy Savings Using Ceiling Insulation Mixed with Desiccant" Dec. 19, 2005 (unpublished), pp. 1-35.

Technical Bulletin No. 200 "Mechanical and Miscellaneous Properties of Eval Resins and Films".

Noltex, Film Application (NoltexEVOHcoextrusions), prior to Mar. 2005.

Physical Properties of EVAL Film, 1 pg. (EVAL Film Data), prior to Mar. 2005.

Soarnol "Water Vapor Permeability and Moisture Absorption/ Water Absorption".

Soarus, L.L.C.http://www.soarus.com/soarnol.soarnol.html, Jan. 6, 2005, 1 pg (SoarusEVOH).

Chougule et al., Development of Novel Barrier Heat Seal Layers with Reduced Absorption Using Smart Bnelding Technology, prior to Mar. 30, 2005.

Cooksey et al., "Predicting Permeability & Transmission Rate for Multilayer Material", Foodtechnology, Sep. 1999, vol. 53, No. 9, pp. 60-63 (Multilayer-FilmWVT).

(56) References Cited

OTHER PUBLICATIONS

Del Nobile et al., A New Approach to predict the Water-transport Properties of Multilayer films Intended for Food packaging Application, Journal of Food Science, vol. 69, No. 3, pp. FEP85-FEP90 (Del Nobile EVOH).
EVAL Americas, EVAL E171 Data Sheet (EVAL Data Sheets), Aug. 2004.
EVAL Americas, What are EVAL Resins Mar. 27, 2005, 1 pg. (EVALEVOH), prior to Mar. 27, 2005.
Gatland, Comparison of Water Vapor Permeance Data of Common Interior Building Materials in North American Wall Systems, May 2005, pp. 182-194, Ottawa, Canada (Gatland).
Huang et al. "Morphological, Thermal, barrier ad Mechanical Properties of LDPE/EVOH Blends in Extruded Blown Films", Journal of Polymer Research 11:75-83. 2004 (Huang).
Intello Technical Data, prior to Mar. 2005.
Lee et al., "Effect of Compatibillizer on the Crystallization, Rheological, and Tensile Properties of LDPE/EVOH Blends," Journal of Applied Polymer Science, 1998, vol. 68, 1245-1256, South Korea.
Marais et al., "Transport of Water and Gases through EVA/PVC blend films-permeation and DSC investigations," Elsevier, Polymer Testing, 2003, pp. 475-486.
Admer, http://www.mitsuiplastics.com/products/28admere.html, Mar. 6, 2005, 1 pg (EVOHcoextrusions).
Soarnol, What is Soarnol?, (SoaranoEVOH), Jan. 2005.
The feature in the summer of Xavan BF (Xavan), prior to Mar. 2005.
Kunzel, Hartwig M. "Performance of Innovative Vapor Retarders Under Summer Conditions," Ashrae Transactions 2001, V. 107, pt. 1 pp. 1-4.
Permeability, EVOH-29 Film, 5 pages, 1997.
Givoni, Baruch. Passive and Low Energy Cooling of Buildings. John Wiley & Sons: Hoboken, NJ, 1994 (p. 121).
Abaza, H.F. The Use of Attic Space for Cooling and Dehumidification, Internal Refrigeration and Air Conditioning Conference, Paper 536, 2002.
Lstiburek, Joseph. "Vapor Barriers and Wall Design," Research Report-0410. Building Science Press, Nov. 2004.
Stedim 71 Film Technical Information Sheet "Film Mechanical Values" Mar. 27, 2005 1 pg.
Zhang et al. "Permeation of Oxygen and Water Vapor Through EVOH Films as Influenced by Relative Humidity" Journal of Applied Polymer Science, vol. 82, pp. 1866-1872 (2001).
International Search Report dated Jun. 12, 2006 with regard to International application No. PCT/IB2006/02112.
International Search Report dated Sep. 8, 2000 with regard to International application No. PCT/US00/11461.
European Search Report with regard to European patent application EP 00 61 0119, dated Mar. 12, 2001.

\* cited by examiner

ROOFING COMPOSITE INCLUDING DESSICANT AND METHOD OF THERMAL ENERGY MANAGEMENT OF A ROOF BY REVERSIBLE SORPTION AND DESORPTION OF MOISTURE

This application claims priority to and the benefit of U.S. Provisional Pat. App. Ser. No. 61/651,094, filed May 24, 3012, and U.S. Provisional Pat. App. Ser. No. 61/617,955, filed Mar. 30, 2012, both of which are incorporated herein by reference in their entirety.

BACKGROUND OF THE INVENTION

1. Field of the Disclosure

The present invention relates in general to roofing and, in particular, to a system, method and apparatus for thermal energy management in a roof by reversible sorption and desorption of moisture.

2. Description of the Related Art

Typical residential roofs in the North America have bitumen-based roofing materials that provide satisfactory water shedding, long term durability and have aesthetic appeal. Most asphaltic roofing materials are colored in traditional dark earth tones. These colors absorb significant amounts of solar heat during hot summer times, which penetrates through the roof deck, attic and ceiling into the house. The heat penetration increases the need for cooling energy for the indoor comfort of residence occupants.

On the other hand, these types of roofing products usually have good thermal emittance and low thermal mass. These properties allow them to quickly re-radiate and lose solar heat during the night. This results in the so-called "super cooling" effect that may increase the heating energy need to maintain indoor temperatures during the night. This issue is particularly problematic for cold to moderate climate regions, and for seasons where the day and night temperature differences are significant, such as in the spring or fall seasons.

Therefore, it would be advantageous to have a roofing system that can store or manage the solar heat during the day, and then release that heat into the house during the night to improve the energy efficiency of the house. It would be a further advantage to have such a system that is compatible with current asphaltic shingle aesthetics, and can be readily applied with existing roofing techniques and construction practices.

Some asphaltic shingles have improved solar reflectance that reduces the absorption of solar heat. Although such products lower cooling energy costs, particularly in warmer climates, they are not designed for managing solar heat during the night or for significant seasonal changes. In colder climates, these products can have heating penalties due to the loss of solar heat. This is also true when radiant barriers are used to reduce solar heat flux into the attic. Radiant barriers do not capture or manage solar heat.

Other conventional solutions include ventilated decks and ventilation systems that reduce heat flux into the attic via air flows to expel heat. Again, these systems do not store or manage solar heat for the later cooler times of day. Therefore, it would be advantageous to have a roofing material/system that can store or manage the solar heat during the day time and then release back into the house during the night time to optimize whole building energy efficiency. It is further advantageous to have such a material/system that will not affect current asphaltic shingle aesthetic values or can be applied easily with current known roofing technique or construction practices.

SUMMARY

Embodiments of a system, method and apparatus for thermal energy management of a roof by reversible sorption and desorption of moisture are disclosed. For example, a roof system may comprise a roof deck on a building, and a roof barrier secured to the roof deck. The roof system has a thermal energy absorbing product including a desiccant located between the roof deck and the roof barrier. The desiccant reversibly adsorbs and releases moisture, and in response thereto heat is reversibly released and absorbed by the desiccant to effect a thermal management of the roof system.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
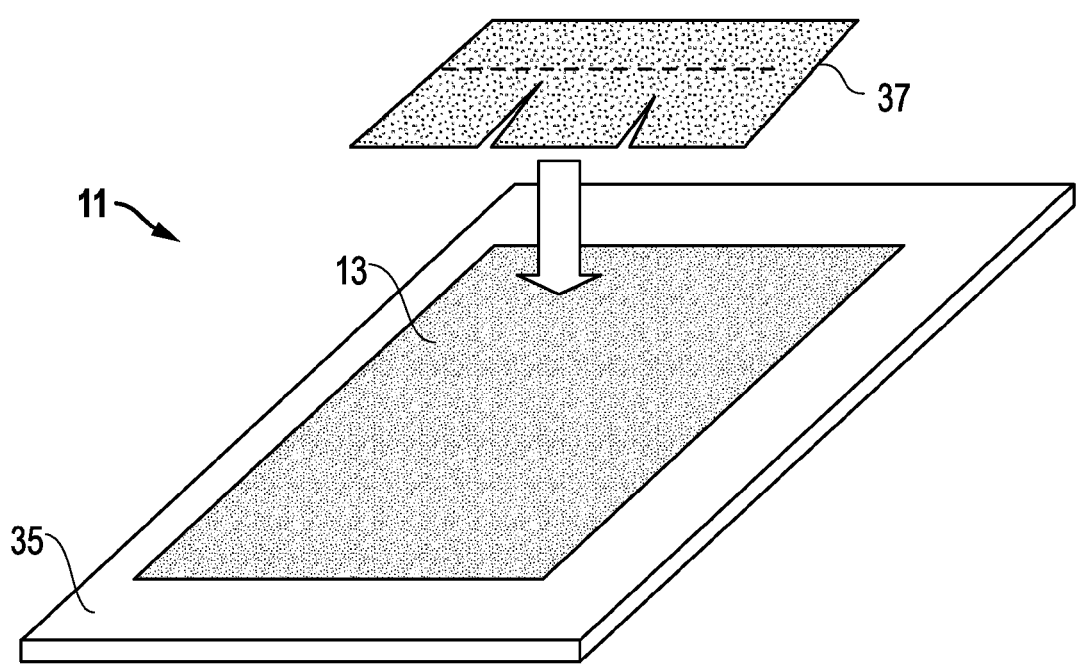
FIGS. 1-3 are isometric views of embodiments of a roof product.

Embodiments of a system, method and apparatus for thermal energy management of a roof by reversible sorption and desorption of moisture are disclosed. For example, a roof product 11 or thermal energy absorbing product (TEAP) may comprise a sheet or a panel (which may be rigid; see, e.g., FIGS. 1 and 2) or a flexible roll of material (see, e.g., FIG. 3) having a plurality of layers and/or materials.

In some embodiments, the roof product 11 comprises only a desiccant 13 (FIG. 1), such as a desiccant-filled sheet, for use as a heat absorbing layer and as an underlayment. Examples of desiccants are described in U.S. Pat. App. Pub. 2010/0107550, which is incorporated herein by reference in its entirety. Some embodiments of the desiccant may comprise clay, nano-clay, montmorillonite clay, synthetic zeolite, surface modified carbon, carbon molecular sieve, activated carbon, calcium oxide, calcium sulfate, salt, inorganic salt, silica gel, activated alumina, polymeric desiccant material (e.g., sodium polyacrylate), cellulose material, metal silicate, or any combination thereof.

The desiccant materials may comprise moisture adsorbents (i.e., a surface phenomenon), not necessarily those desiccants that dissolve into liquid (i.e., via chemical reaction) when absorbing enough moisture. Advantageously, heat is absorbed by the moisture inside the desiccant. When heat is absorbed by the moisture in the desiccant (such as during a weather heating cycle), the moisture changes from a liquid water phase to a water vapor phase, and the moisture evaporates from the desiccant. In addition, when water vapor in the air condenses onto the surfaces of the porous structures of the desiccant (such as during a weather cooling cycle), heat is released from the desiccant to the building on which the roof product is installed. This process repeats as the roof product experiences weather heating and cooling cycles.

In the summer during daylight, some embodiments of the desiccant absorb heat (e.g., heat flow from outside) and release moisture to reduce the flow of heat into a building. In winter during daylight, some embodiments of the desiccant absorb heat (e.g., heat from inside) and release moisture to reduce the flow of heat to outside of a building. In summer and winter at night, the desiccant may absorb moisture and release heat to both outside and inside a building. During winter, there is less moisture in the air than during summer, so there may be less energy savings than during the summer.

The desiccant 13 may be mounted between a roof deck 35 and roof barrier 37 (e.g., shingle). In other embodiments (FIGS. 2 and 3), a vent layer 15 having channels 17 that may be used to transfer excess moisture through an entire length L of the roof product 11. A fire retardant 19 may be included to suppress fire through the vent layer 15. The desiccant 13, vent layer 15 and fire retardant 19 may form a unitary structure as shown.

Figure 2:
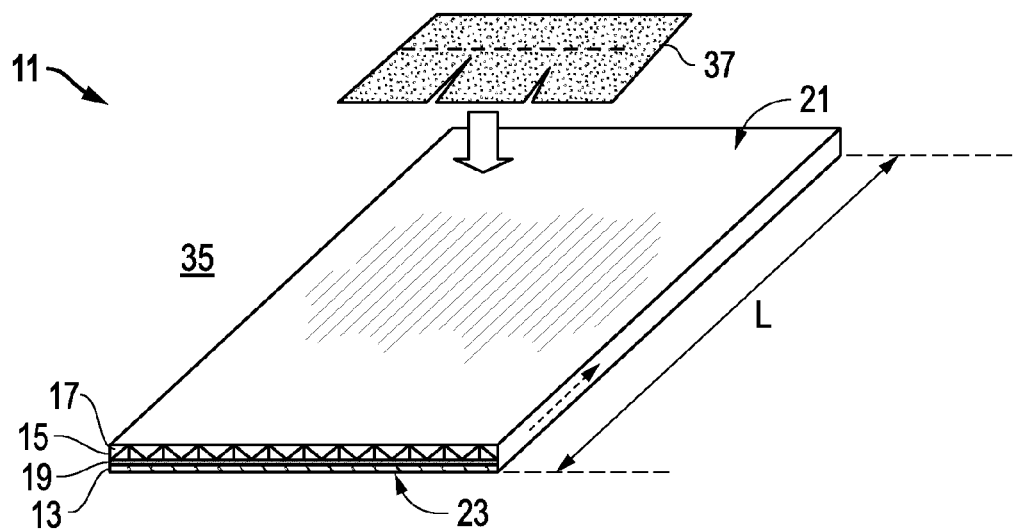
Figure 3:
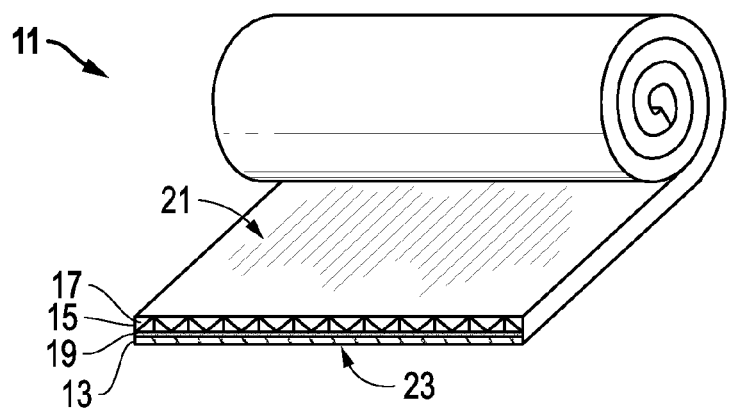

In other embodiments, the roof product 11 further comprises outer skin layers comprising an uppermost layer 21 and a lowermost layer 23, between which may be located the desiccant 13, the vent layer 15 and the fire retardant 19. As shown in FIGS. 2 and 3, the fire retardant 19 may be located between the desiccant 13 and the vent layer 15. The vent layer 15 also may be located between the desiccant 13 and the fire retardant 19.

Still other embodiments of the roof product 11 may include an upper radiant barrier 31 (FIG. 4) and a lower moisture barrier 33, such that the roof product 11 comprises the only material located between the roof deck 35 and the roof barrier 37. The uppermost layer 31 may be UV resistant. Versions of the roof product 11 may have a thickness T of about 0.75 to 2.5 inches. For example, the desiccant 13 may have a thickness of about 0.25 inches to about 1 inch, the vent layer 15 may have a thickness of about 0.25 inches to about 1 inch, and the fire retardant 19 may have a thickness of about 0.25 inches to about 0.5 inches.

In still other embodiments, the intumescent may expand in the presence of fire to about 20 times its original volume. Thus, fire retardant thickness may comprise a ratio of about $\frac{1}{20}^{th}$ of the vent layer thickness. For example, for a vent layer thickness of about 0.25 inches, the fire retardant thickness is at least about 0.01 inches to effectively block air flow through the vent layer 15. In addition, the roof product 11 may be configured with an overall weight per unit area in a range of about 1 pound per square foot ($lbs/ft^2$), to about 10 $lbs/ft^2$, or less than about 10 $lbs/ft^2$, or less than about 5 $lbs/ft^2$, or less than about 3 $lbs/ft^2$.

In some embodiments, the desiccant 13 may have a heat of absorption of greater than about 30 $kJ/mol-H_2O$ to store solar heat during a heating cycle, and has a thermal emittance of greater than about 0.70 that re-radiates stored heat during a cooling cycle. For example, the heat of absorption may be greater than about 30 $kJ/mol-H_2O$, and a heat absorbing range thereof may be about 10° C. to about 50° C., or about 20° C. to about 40° C. In other embodiments, the desiccant may have a heat of absorption of greater than about 20 $kJ/mol-H_2O$, greater than about 25 $kJ/mol-H_2O$, greater than about 35 $kJ/mol-H_2O$, or greater than about 40 $kJ/mol-H_2O$ to store solar heat during a heating cycle. In still other versions, the desiccant may have a heat of absorption of less than about 70 $kJ/mol-H_2O$, less than about 65 $kJ/mol-H_2O$, or less than about 50 $kJ/mol-H_2O$ to store solar heat during a heating cycle. Other versions of the roof product include two or more desiccant materials having different heat capacities and/or heat absorbing ranges.

Figure 5:
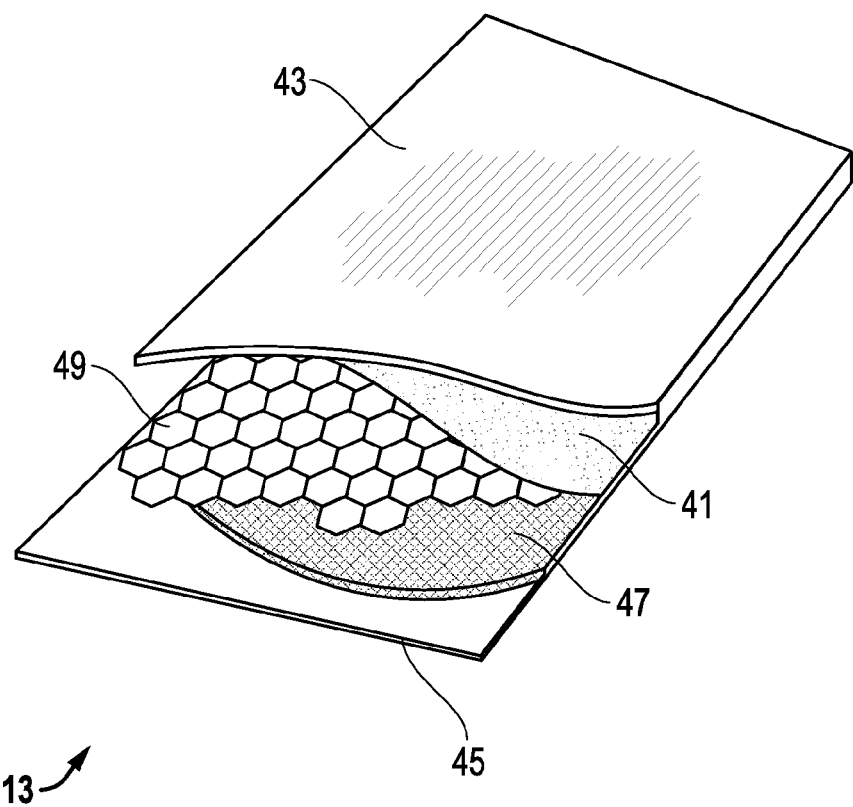
FIG. 5 is a partially sectioned, isometric view of another embodiment showing layers of a roof product.
Figure 6:
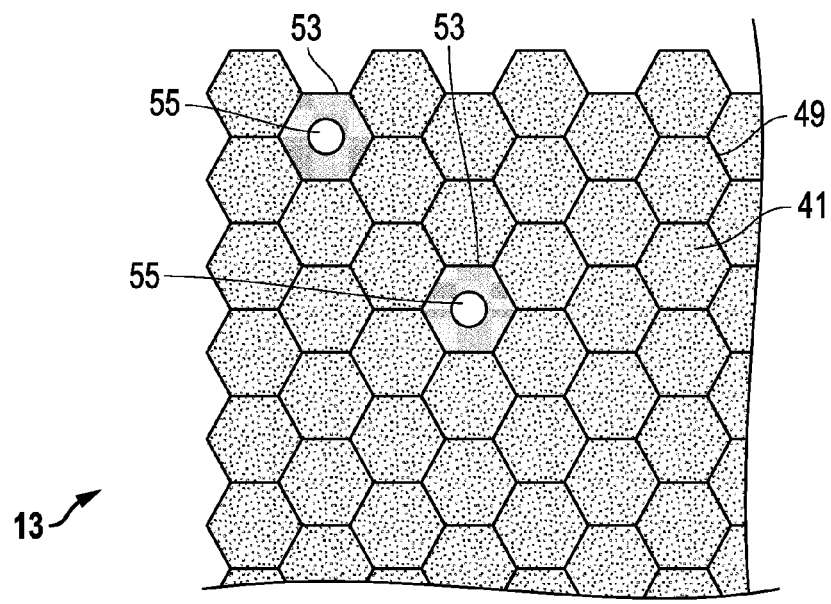
FIG. 6 is an enlarged top view of an embodiment of a roof product.
Figure 7:
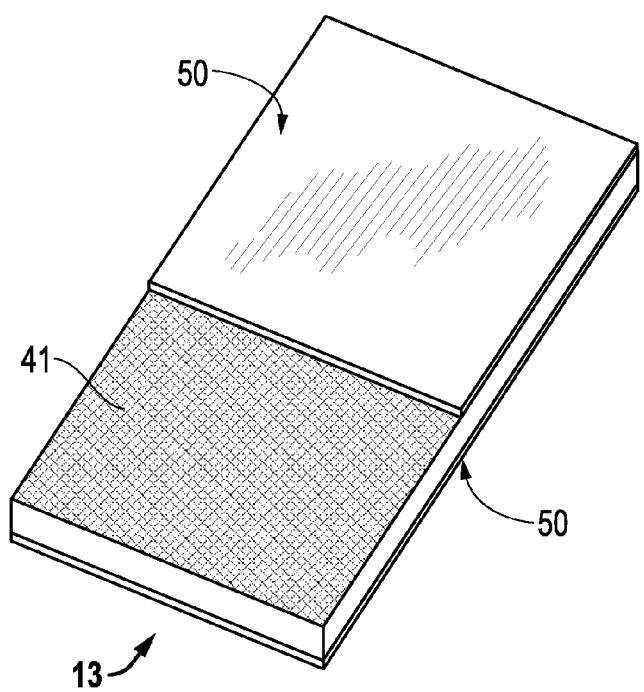
FIG. 7 is a partially sectioned, isometric view of an embodiment showing layers of a roof product.

The desiccant 13 may comprise a powder or be in a granulated or encapsulated form with sizes that are less than about 0.5 mm in diameter. As shown in FIG. 5, the desiccant 13 may comprise media 41 located between skin layers 43, 45, with or without an adhesive 47. In the example of FIGS. 5 and 6, the media 41 may be located in a structure 49 having cavities (e.g., an array of honeycomb cavities with vertical axes). FIG. 7 depicts an embodiment of the desiccant 13 having outer skin layers 50 that contain moisture storage media 41 in a binder matrix. Such media may be formed, for example, by extrusion, gel casting, lamination, solvent casting or extrusion coating.

Referring again to FIGS. 2 and 3, the channels 17 in the vent layer 15 may have openings along the edges thereof that extend completely through the roof product 11 along length L. Each opening may have an effective area of about 0.01 $in^2$ to about 1 $in^2$, or about 0.05 $in^2$ to about 0.5 $in^2$ in other embodiments.

Figure 8A:
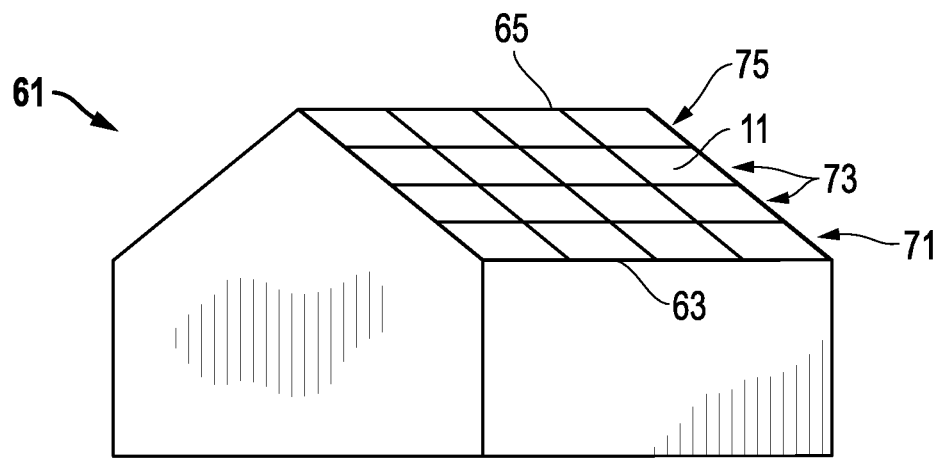
FIGS. 8A and 8B are schematic isometric views of buildings having embodiments of roof products installed thereon.
Figure 8B:
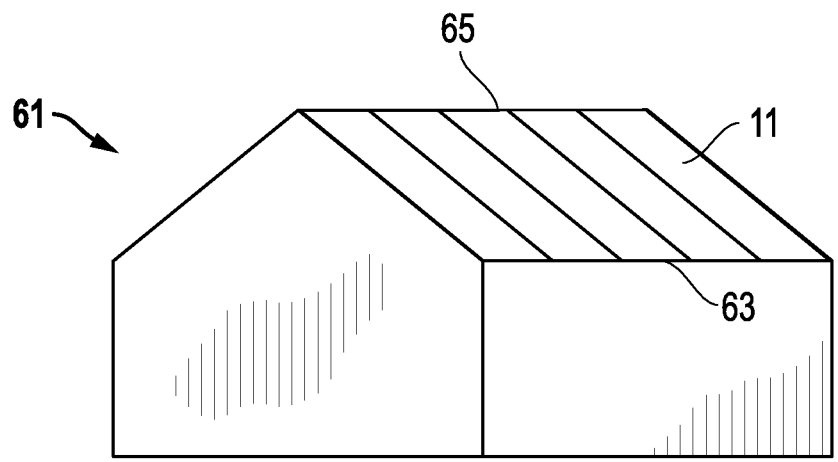

As shown in FIGS. 8A and 8B, a plurality of the roof products 11 is assembled in an abutting configuration on the roof of a building 61. FIG. 8A depicts the roof products 11 in sheet or panel form, while FIG. 8B depicts the roof products 11 in roll form. The vent layer 15 of roof product 11 is adapted to vent excess heat from an eave 63 of the roof up to a ridge 65 of the roof and out to atmosphere. The vent layers 15 inside roof products 11 may be positioned to vent excess heat via natural air flow from the lower eave 63 of the roof up to the ridge 65 of the roof. Thus, the channels 17 of the vent layers 15 may form substantially contiguous, uninterrupted air flow paths between abutting products having inlets substantially only adjacent the eave 63 of the roof and outlets substantially only adjacent the ridge 65 of the roof. The openings of channels 17 are large enough to eliminate the need for precise alignment of the inlets and outlets of adjacent, abutting products 11 such that a path for air flow is substantially unimpeded.

The roof product 11 may comprise rolls of material (FIG. 8B) that extend continuously from adjacent the eave 63 to adjacent the ridge 65 to form continuous, uninterrupted air flow paths having inlets only adjacent the eave and outlets only adjacent the ridge, such that there is no air flow communication in the channels 17 between laterally adjacent rolls of the roof product 11.

Alternatively, some embodiments may include the capacity of lateral flow of air between channels with lateral openings. A plurality of roofing products 11 may be laid up on a roof deck with adjacent roof products 11 being arranged side-by-side, in horizontal and vertical courses (horizontal only in FIG. 8B) from a lower end 63 of the roof deck to an upper end 65 thereof. Their vent channels 17 may communicate laterally (side to side) with each other through one or more lateral openings, for providing airflow through successive horizontal courses of the roofing products 11 within in the same vertical course.

Figure 4:
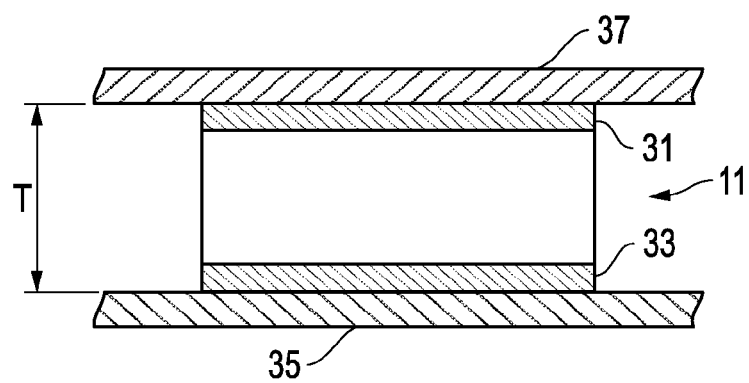
FIG. 4 is a sectional view of an embodiment of a roof product installed in a roof of a building.

As depicted in FIGS. 2 and 4, the roof product 11 is directly fastenable to the roof deck 35 of a building, and is covered by outer roof barriers 37 (e.g., shingles, tiles, membranes, etc.). Roof barriers 37 may be located on top of the roof products without substantially affecting an overall thickness and functionality of the roof products 11. In the embodiment of FIG. 6, the roof product may be provided with a plurality of cells 53 that are adapted to be penetrated by roofing fasteners 55, such as nails. The cells 53 may be void of a material 41 used to form the desiccant 13.

In some embodiments, skin layers may be added to enhance the walkable surface for roofers, particularly in wet conditions. The skin layers may be configured for walkability and may include elements such as synthetic underlayment products. In addition, they may provide some UV resistance for short term exposure (e.g., one year of UV stability) if left unprotected on the roof. Furthermore, the skin layer may be combined with a radiant barrier, such as aluminum foils, metalized films, mirrorized surfaces, etc., to reflect solar heat.

The desiccant may comprise a desirable heat of absorption that can store solar heat over an extended period of time. It may have a desirable thermal emittance that re-radiates stored heat during night time or during extended cold periods to leverage the stored solar heat for greater indoor comfort. In some embodiments, the desiccant absorbs heat in a given range of temperatures and releases the stored heat upon cooling in a selected range of temperatures. Moreover, the roof product remains flexible in lower temperatures down to about 0° C., and remains structurally sound for a roof walkable surface in higher temperatures where a roof surface temperature may exceed 70° C.

The desiccant may perform without leakage even after being penetrated by roofing nails. For example, when a nail penetrates the structure, it goes through only a small number of capsules, leaving the vast majority of them intact over the roof area.

For embodiments with venting channels, the channels may provide sufficient openings for air flow, but not for insect infiltration or infestation. For example, a screen structure may be employed to inhibit such. The openings also are not so small that they are susceptible to clogging from airborne dust or contamination. Suitable materials for this layer may comprise thermoplastics, thermoplastic elastomers, aluminum, thermoset resins, cellulose composite, wood composites, rubbers, or their mixtures. The layer may contain fillers or functional fillers, fire retardants, or intumescent agents to reduce or block the air passages in the event of a fire. The layer may further contain biocides or fungicides to prevent or inhibit microbial growth. The layer may be constructed, for example, by industrial processes such as extrusion, injection molding, compression molding, pultrusion, lamination, or thermal forming.

Embodiments of the fire retardant reduce the risk of a fire spreading and penetrating into the underlying roof deck. This material may reduce the size of or block the air passages of the venting layer during a fire. It also may provide a charring or fire suffocating effect to prevent further spreading of fire. For example, it may provide Class A fire protection for the underlying roof deck. Suitable fire retarding media may comprise expandable clay, expandable carbon black, intumescent silicates, hydrated metal silicates, bromated compounds, halocarbons, aluminum hydroxide, magnesium hydroxide, hydromagnesite, antimony trioxide, various hydrates, red phosphorus, boron compounds, phosphonium salts, or their mixtures.

In some embodiments, the fire retardant may be combined with the desiccant. For example, such a combination may comprise forming the fire retardant as part of the skin layer for the desiccant, or by intermingling the flame retarding media with the moisture storage media within the layer. Other versions may include a fire retardant applied as a separate accessory to the roofing product. For example, a strip of "fire stop" tape may be applied near the bottom or top of the vent channels to close the channels in the event of fire.

In other embodiments, the fire retardant may be combined with the air venting layer by incorporating the fire retardant as a skin layer, or by incorporating the fire retardant media in the materials for construction the venting layer. In addition, the fire retardant media may be dispersed or incorporated into the materials for forming the roof deck composite. Other variations to the construction of the roof deck composite for managing solar heat will become apparent to those who are skilled in the art.

The roof composite for absorbing solar heat may comprise a carrier or carrier layer and a thermal heat absorbing layer comprised of desiccant materials. Additional multi-layer configurations where other functional layers, such as a skin layers with proper moisture permeability, a layer providing air ventilation to reduce heat flux, and/or a structural layer for improving strength, or their combinations, also may be included in the composite. The roofing composite can be a sheet form, a roll form, a three dimensional structural shape, or as part of existing roofing shingle or tile configuration. The roof composite may be applied as stand-alone layer on roof deck prior to shingle installation, or can be as an underlayment layer, or as part of roofing article during manufacturing of the roofing article.

The heat absorbing layer may comprise one or more materials that will absorb moisture wherein they can act as a heat sink at elevated temperatures, particularly during daytime to absorb solar heat; and become a heat source during the nighttime where the temperatures dropped and the moisture released. Although the latent heat of the adsorption/desorption of water is well documented, the embodiments disclosed herein work well as a heat management material as the moisture transport during daytime and nighttime.

A carrier layer may provide the integrity and adequate strength such that the resultant roofing composite can be transported, handling by installer, and applied on a job site. Also, it may provide adequate weathering or durability for roof environments, unless it will be protected by additional UV protecting layer.

In one aspect the carrier layer may contain the desiccant in a zone adjacent a venting channel so that air transport adjacent the desiccant can facilitate reversible sorption and desorption of moisture to manage heat transfer. The desiccant can be disposed within a relatively open structure with a high surface area to allow easy moisture transfer. A film or sheet with desired permeability may be used to contain the desiccant within the open structure. In one embodiment the film or sheet is a polymeric film having a moisture permeability that varies with temperature and/or humidity, such as the MemBrain™ vapor retarder films available from CertainTeed.

Alternatively, a woven or nonwoven web or mat of polymer or glass having a porous and open structure to let moisture transfer in and out of the desiccant is provided on a face of the desiccant zone adjacent to the venting channel. The porosity or openness of the structure is fine enough in texture so that the desiccant is contained. For example, a particulate desiccant having a high surface area can be contained within cells of a honeycomb structured panel by means of a porous and/or permeable sheet or film.

Alternatively, the desiccant may be contained within a porous open structured web sandwiched between containment sheets, at least one of which is porous and/or permeable and oriented adjacent a venting channel in a roofing product construction. A film or paper layer of material may have a physical porosity further controlled or modified by microperforating or needle punching.

Figure 9:
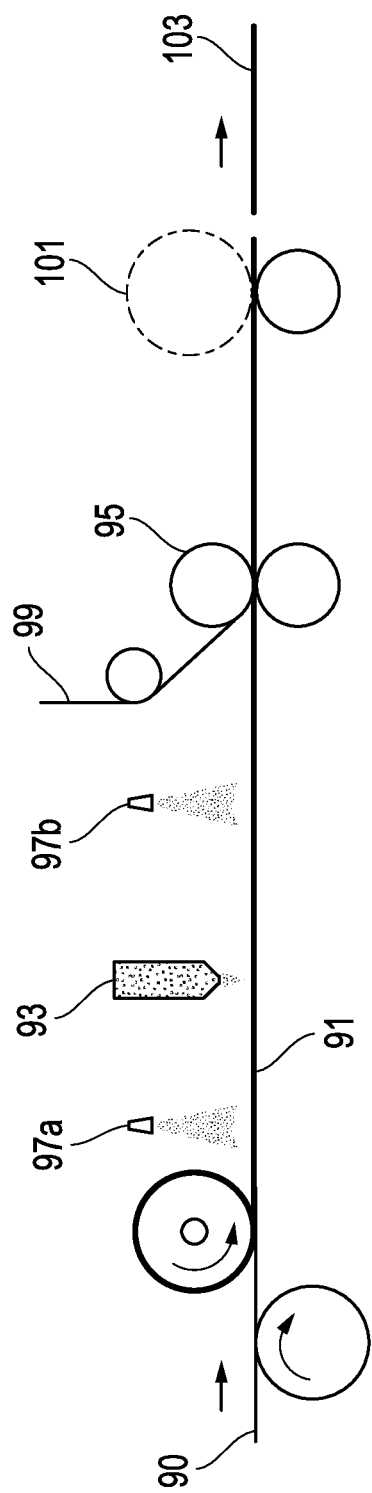
FIG. 9 is a schematic side view of an embodiment of a method of manufacturing a roof product.
Figure 10A:
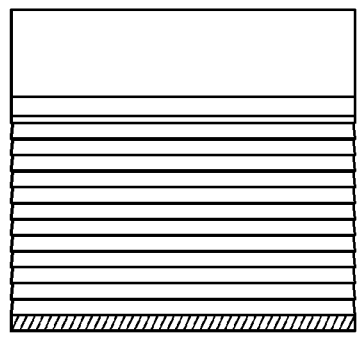
FIGS. 10A-10D are various views of test huts.
Figure 10B:
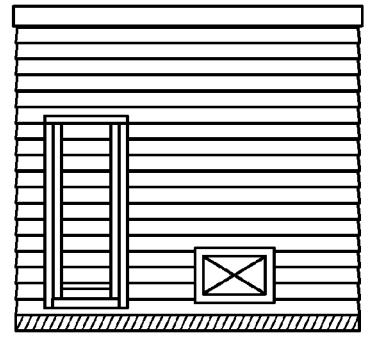
Figure 10C:
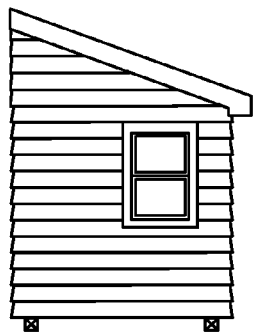
Figure 10D:
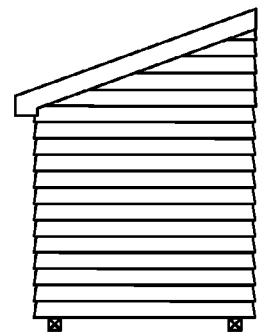

FIG. 9 depicts an embodiment of a process for making the roof composite. The method may include preparing a carrier layer 91 in a web process (with or without an optional backing film 90), depositing a desiccant or TEAP material 93 on the carrier layer 91, performing an optional packing/calendaring process 95, fixing the desiccant materials to the carrier layer (e.g., such as with an optional adhesives 97a, 97b or optional top film 99), followed by cutting 101 into suitable dimensions or packaging 103 into suitable form for roofing applications. The process is schematically shown in FIG. 4 and various variations will become apparent to those who are skilled in the art. If the carrier layer is part of a multi-layer composite or part of the roofing article, additional steps may follow after the fixing of the desiccant powders in the carrier layer, such as laminating onto another layer or adhering to the roofing article.

In still other embodiments, a roof system may comprise a roof deck on a building; and a roof product secured to the roof deck; and an underlayment or TEAP comprising a desiccant located between the roof deck and the roof product, whereby the desiccant reversibly absorbs and releases moisture, and thereby heat is reversibly released and absorbed by the desiccant to effect a thermal management of the roof system.

The desiccant may have a heat of absorption that stores solar heat during a heating cycle, and has a thermal emittance that re-radiates stored heat during a cooling cycle. The desiccant may comprise a powder, sheet form, or an encapsulated form with sizes that is in a range of about U.S. mesh #10 to about U.S. mesh #325, or about U.S. mesh #60 to about U.S. mesh #325, or about U.S. mesh #100 to about U.S. mesh #325.

The TEAP may comprise a rigid sheet, a rigid panel or a flexible roll. The TEAP may comprise a non-woven mat, glass mat, woven mat, scrim, felt, Kraft paper, honeycomb board, channeled panel, industrial fabric, recycled mat, porous ceramic board, cementitious board, wood composite, plastic wood, inorganic bonded composite, gypsum board, or any combination thereof. The TEAP may have an effective heat of absorption to regulate at least 5% of solar energy incident thereon, at least 10% of solar energy incident thereon, or greater than 20% of solar energy incident thereon, or greater than 30% of solar energy incident thereon.

The roof product may be attached through the TEAP to the roof deck with fasteners or adhesives. The TEAP may be directly nailable for roofing shingles on top thereof without affecting an overall thickness and functionality of the TEAP. The TEAP may be flexible in lower temperatures about 0° C., and remains structurally sound for a roof walkable surface in higher temperatures where a roof surface temperature exceeds about 70° C.

In addition, the TEAP may have a plurality of cells configured to be penetrated by roofing fasteners, and the cells are void of the desiccant. The TEAP may include an upper radiant barrier and a lower moisture barrier, such that the TEAP comprises the only material located between a roof deck and a roof product. The TEAP may have a thickness of about 0.75 inches to about 2.5 inches, or about 0.25 inches to about 1 inch. The TEAP may have a weight in a range of about 1 pound per square foot to about 10 pounds per square foot.

The roof system may further comprise an additive, a fire retardant, an anti-microbial addition, a UV stabilizer, a UV protection layer, or any combination thereof. The desiccant and fire retardant may form a unitary structure. The fire retardant and the TEAP each may comprise media, and the media are mixed and combined in a single layer. The single layer may comprise less than about 25% of the fire retardant, less than about 10% of the fire retardant, or less than about 5% of the fire retardant.

The roof system may further comprise a skin layer (e.g., polymeric, porous, etc.) adjacent the desiccant. The skin layer may have permeability that will not vary with temperature or humidity, since the moisture is capable of coming in or going out at various temperatures for absorbing or desorbing to occur with the desiccant. The moisture permeability of the skin layer may be greater than 2 perm, greater than 5 perm, or greater than 10 perm. The skin layer may comprise an uppermost layer and a lowermost layer, between which are located the desiccant.

The desiccant may have a moisture permeability that varies with at least one of temperature and relative humidity, and may include membrane properties for permeability. The desiccant may be provided with selected water absorption/desorption properties.

The roof system may further comprise a ventilation channel adjacent the desiccant, whereby air having a humidity flowing through the ventilation channel transports moisture to and from the desiccant, and the heat thus absorbed and released by the desiccant effects thermal management of the roof system.

An embodiment of an underlayment may be configured to be located on a roof between a roof product and a roof deck. The underlayment may comprise a desiccant; and a ventilation channel adjacent the desiccant, whereby air having a humidity flowing through the ventilation channel is configured to reversibly transport moisture to and from the desiccant, such that heat is reversibly released and absorbed, respectively, by the desiccant to effect a thermal management of the roof.

The ventilation channel may be adapted to ventilate an entire length of the roof. The desiccant, ventilation channel and a fire retardant may form a unitary structure. The ventilation channel may comprise a carrier and structural layer for the desiccant. The underlayment may further comprise a skin layer between the desiccant and ventilation channel, the skin layer having a porosity controlled by microperforation or needle punch. The porosity may comprise micropores that are configured to permit water vapor to pass therethrough but the micropores do not transmit liquid water.

The fire retardant may comprise materials used to form a structure for the ventilation channel, such that the fire retardant and the ventilation channel are combined in a single layer. The fire retardant may comprise an accessory that is applied to the underlayment near an entry or exit of the ventilation channel. The fire retardant may be located along a single edge of the underlayment. The underlayment may have a planar area and the fire retardant may comprise an area that is less than the planar area, such that the fire retardant is located adjacent only a portion of the ventilation channel.

In yet another embodiment, an underlayment may be configured to be located on a roof between a roof product and a roof deck. The underlayment may comprise a desiccant configured to transport moisture to and from the roof deck, and thereby heat is released and absorbed by the desiccant to effect a thermal management of the roof. The underlayment also may be configured as described for the other embodiments.

Embodiments of a method of making a roof component may comprise preparing a carrier layer in a web process; providing a desiccant to the carrier layer, the desiccant being adapted to absorb heat; fixing the desiccant to the carrier layer; cutting the desiccant and carrier layer into selected dimensions; and packaging a plurality of the cut desiccant and carrier layers.

The method may comprise depositing the desiccant on or in the carrier layer, the desiccant comprising a solid material that is dispersed in a thermoplastic matrix that is extruded and then tentered to disband the solid material from the thermoplastic matrix to form a porous sheet that carries the desiccant. The method may further comprise laminating the fixed desiccant and carrier layer onto another layer after fixing. The method also may further comprise adhering the fixed desiccant and carrier layer onto a roofing article after fixing.

Other embodiments of the method may further comprise packing or calendaring the fixed desiccant and carrier layer; and/or forming a ventilation channel in the roof component; and/or adding to the carrier layer an additive, a fire retardant, an anti-microbial addition, a UV stabilizer, a UV protection layer, or any combination thereof; and/or forming the desiccant and the fire retardant as a unitary structure; and/or forming a skin layer adjacent the desiccant, and providing the skin layer with a moisture permeability that varies with at least one of temperature and relative humidity; and/or forming an uppermost layer and a lowermost layer and locating the desiccant therebetween.

Embodiments of a method of managing thermal energy in a roof of a building may comprise providing a roof having a roof deck, a roof barrier and a roof product with a desiccant located between the roof deck and roof barrier; releasing moisture and absorbing thermal energy with the desiccant during a heating cycle; adsorbing moisture and releasing thermal energy with the desiccant into the building during a cooling cycle, such that the heat absorbed and released by the desiccant effects thermal management of the roof. The method may further comprise many other features and elements as described elsewhere herein for the other embodiments.

In another embodiment, a kit for equipping a roof for thermal management may comprise a plurality of roof products, each of the roof products comprising a desiccant and a ventilation channel having channels to transfer moisture to and from the desiccant, and the heat released and absorbed by the desiccant is adapted to effect a thermal management of the roof; the roof products are adapted to form continuous air vents with the channels from adjacent an eave of the roof to adjacent a ridge of the roof; and attachment means for securing each of the roof products to a roof deck.

The roof products may comprise lower edge eave elements, roof plane elements, and upper edge ridge elements. A fire retardant may be located along at least one of the lower edge eave elements and the upper edge ridge elements, or located in at least some of each of the lower edge eave elements, roof plane elements and upper edge ridge elements. The channels of the ventilation channels may form contiguous, uninterrupted air flow paths between abutting roof products having inlets only adjacent an eave of the roof and outlets only adjacent a ridge of the roof.

The roof products may comprise rolls of material that extend continuously from adjacent an eave of the roof to adjacent a ridge of the roof to form continuous, uninterrupted air flow paths having inlets only adjacent the eave and outlets only adjacent the ridge, and there is no air flow communication in the channels between adjacent lateral rolls. The ventilation channels may be configured to ventilate an entire length of the roof. The kit may further comprise many other features and elements as described elsewhere herein for the other embodiments.

EXAMPLE

Referring now to FIGS. 10-15, two test huts were constructed for an experiment. The test huts were identical with regard to their floors, walls, ceilings and attics, but their roof decks differed from each other. One of the test huts was a control and had a conventional roof deck construction. The other test but was experimental and constructed in accordance with an embodiment herein, including a roof deck system containing a thermal management system. Each test but included equipment to measure their attic temperatures and heat flux into the ceiling. For the experimental test hut, the roof deck included an air gap of about one inch and a layer of desiccant material. The details of the test but configurations are listed in Table 1.

TABLE 1

|  | Control | Experimental |
|---|---|---|
| Roof Assembly | | |
| shingle | Gray colored shingles* | Gray colored shingles* |
| venting channel | No | 1" PC board |
| desiccant material | No | Yes |
| underlayment | #30 felt | #30 felt |
| roof deck | 7/16" OSB | 7/16" OSB |
| attic insulation | R-33 fiberglass batt | R-33 fiberglass batt |
| rafter | 2 × 6 @ 16" O.C. | 2 × 6 @ 16" O.C. |
| Ceiling Assembly | | |
| joist | 2 × 6 @ 16" O.C. | |
| gypsum board | ½" | |
| Wall Assembly | | |
| siding | fiber cement shiplap 5/16" | |
| house wrap | DuPont Tyvek | |
| sheathing | 7/16" OSB | |
| joists | 2 × 4 @ 16" O.C. | |
| insulation | R-13 | |
| wall board | Gypsum 5/8" | |
| window | 2' × 3' PVC window | |
| Floor Assembly | | |
| exterior sheathing | Celotex sheathing ½" | |
| joists | 2 × 6 @ 16" O.C. | |
| insulation | R-30 fiberglass batt | |
| decking | plywood ¾" | |
| additional insulation | board insulation R-10 (2") | |
| Space conditioning | Through-the-wall AC: GE model AJCQ06LCD at capacity of 6400 BTU/hr and 9.9 EER | |

*Landmark Solaris shingle, available from CertainTeed Corp., Portland, OR

Figure 11:
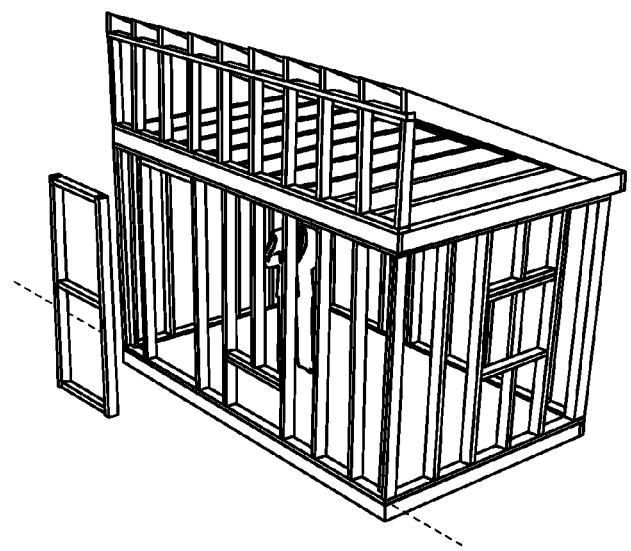
FIG. 11 is an isometric view of the framing for the test huts of FIGS. 10A-10D.
Figure 12A:
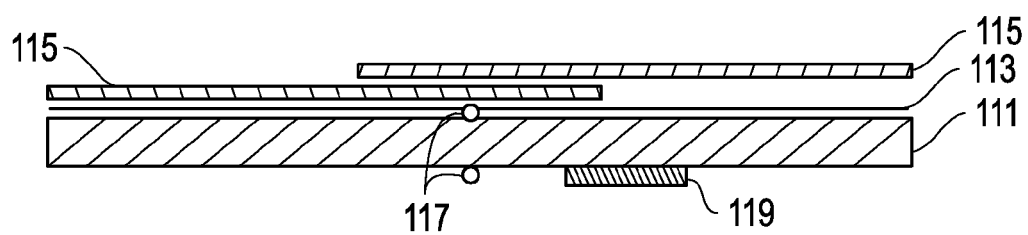
FIGS. 12A and 12B are schematic sectional side views of control and experimental roof decks, respectively.
Figure 12B:
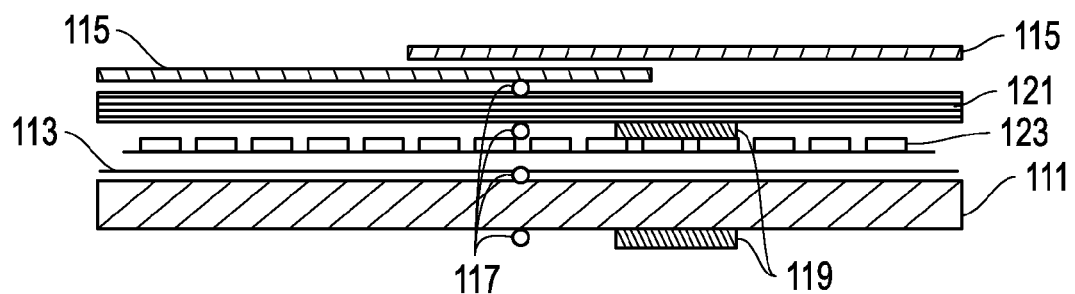

The architecture and dimensions of the test huts are illustrated in FIGS. 10A-10D, and their framing structure is depicted in FIG. 11. Approximate internal dimensions of each finished test but are 6.2 feet high, 11.3 feet wide, and 7.0 feet deep. The internal floor of each but was about 79 ft$^2$ and the roof pitch was approximately 20° with an overhang of 6.5 inches over the south-facing wall. The orientation of each roof faced south as well. The roof deck configurations are shown schematically in FIG. 12. Both test huts included roof decks 111, felt 113, shingles 115, thermistors 117 and a heat flux sensor 119. The experimental but further included venting layer 121, desiccant materials 123 and additional thermistors 117 and heat flux sensor 119, as shown.

The desiccant materials 123 for the experimental test but comprised LiquidBlock 44-OC, from Emerging Technologies, Greensboro, N.C., and montmorillonite clay from Multisorb Technologies, Buffalo, N.Y. The desiccant materials were mixed and then packaged in a honeycomb sheet (available from Plascore Inc., Zeeland, Mich.). The sheet was then covered by laminating a nonwoven fabric having a vapor permeability of greater than 5 perm. The amount of desiccant material used was about 0.5 lb/ft$^2$. The sheet was elevated ⅛-inch above the roof deck with plastic spacers located between the sheet and the roof deck. This small air gap allows for moisture migration into and out of the desiccant materials.

The test huts were constructed and placed in an outdoor environment with a south facing orientation in Albuquerque, N.Mex. The test huts were spaced apart from each other to ensure no shadowing effects on each other. The room inside each test but was maintained at a constant 20° C. with an air conditioning (AC) unit during the daytime. The test huts were not occupied nor did they contain any furniture. Each test but had a window that measured 2 feet by 3 feet to simulate their solar heat gain into the room. The roof shingle temperature, roof deck temperature, attic temperature at both the inner side of the roof deck and at the attic floor, ceiling temperature, room temperature, and wall temperatures were measured by thermistors and thermocouples. The energy consumption, start time, and the run duration of the AC unit were recorded to determine the energy impact. The data was collected with a data acquisition system connected to a computer located inside each of the test huts.

Figure 13:
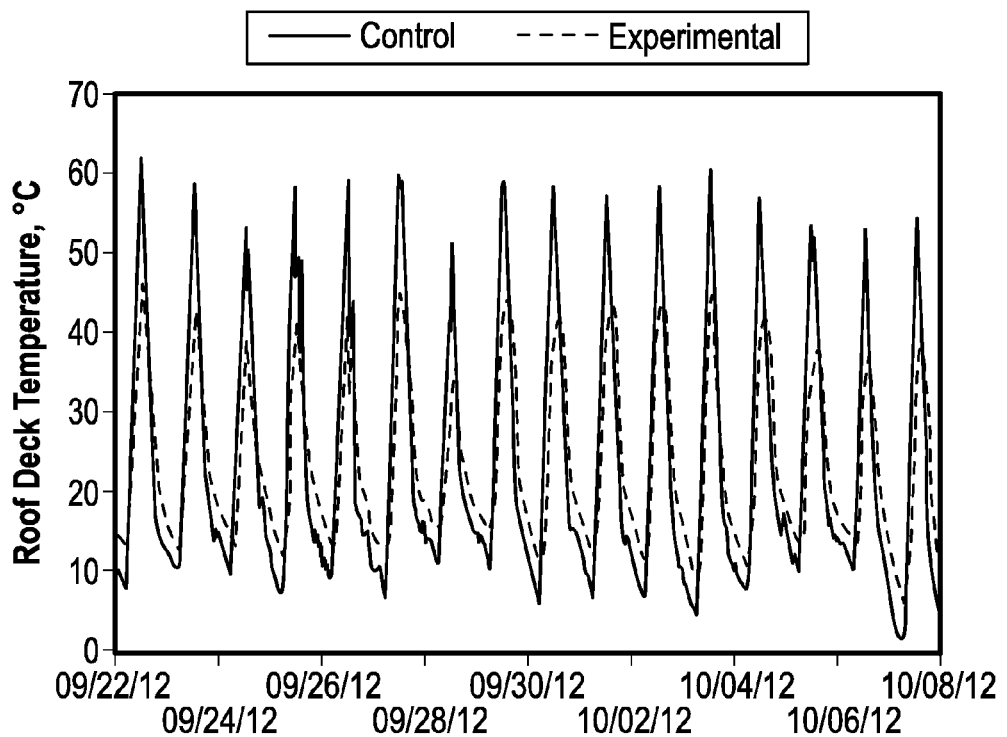
FIGS. 13-15 are plots of performance data for the control and experimental roof decks of FIGS. 12A and 12B.
Figure 14:
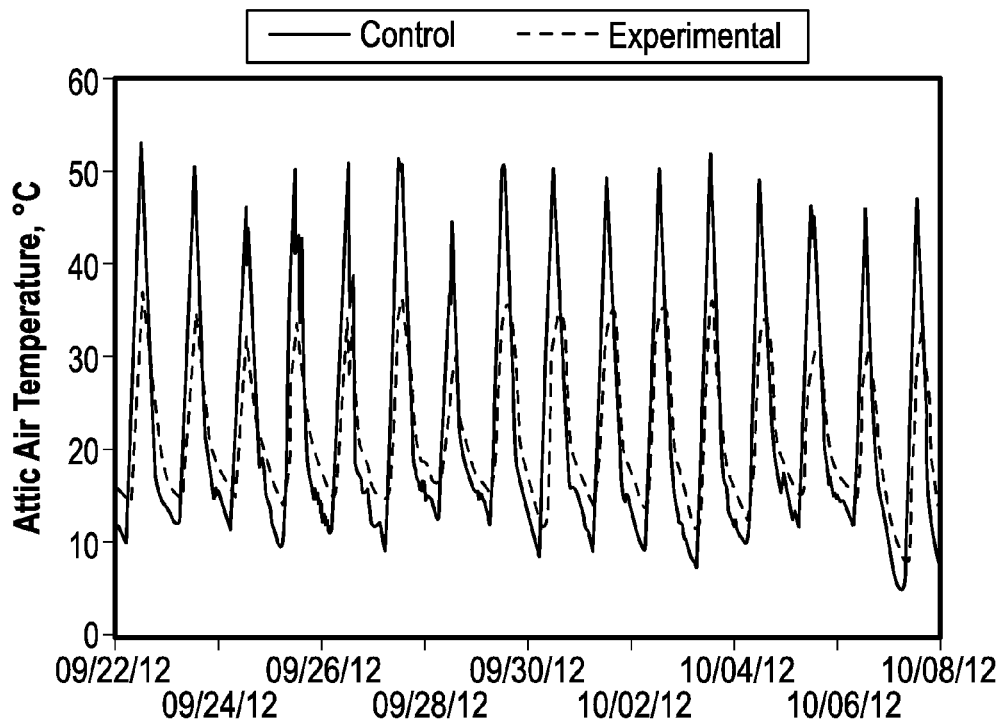
Figure 15:
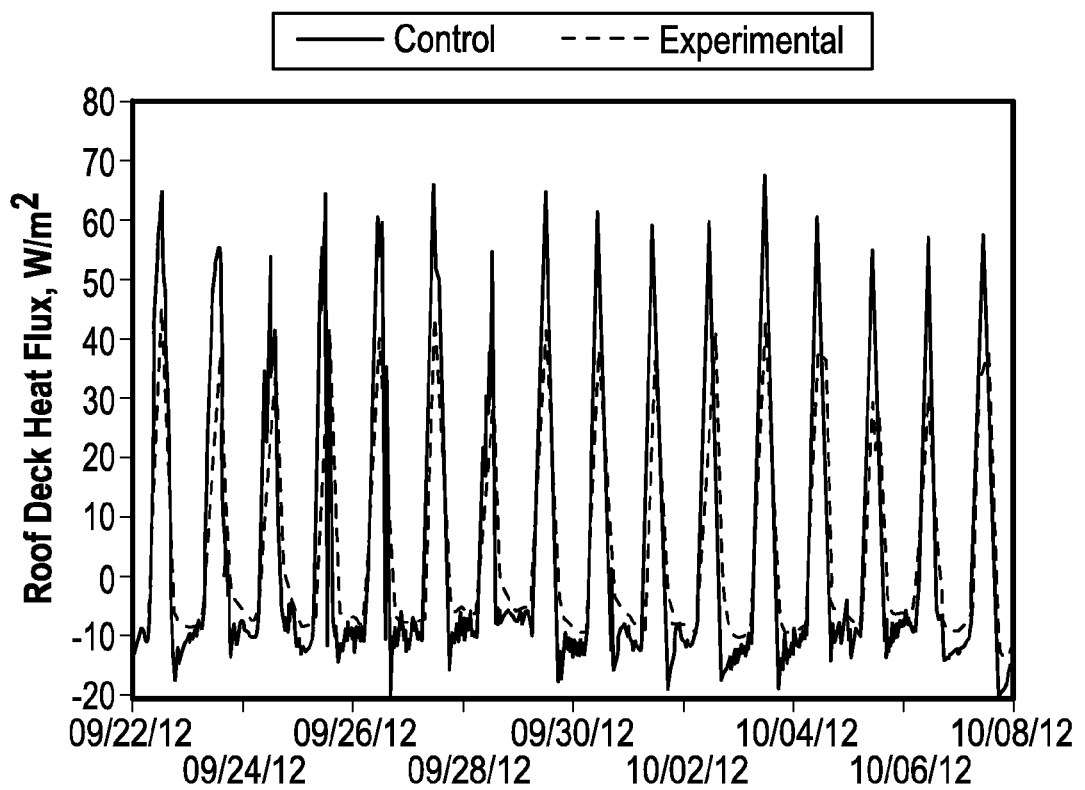

During September and October of 2012, the data was collected in each test hut. The results are shown in FIGS. 13-15. The temperatures of the roof decks (FIG. 13) show that the experimental test but provided a reduction of about 10 to 15° C. compared to the control. This affected the attic air temperatures (FIG. 14) which also show a significant reduction of about 15° C. in peak temperatures and improvement in night time temperatures. This reduction of peak temperatures had a significant delaying effect for reducing the peak hour energy demands (FIG. 15) and also significantly reduced the AC load. The overall AC energy consumption was reduced by an average of about 115 Wh per day during the test period for the experimental test but compared to the conventional test hut. Other examples will be apparent to those who are skilled in the art.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A roof system for a building having an attic in an interior of the building, the roof system comprising:
    a roof deck on an exterior of the building above the attic;
    a roof product secured to the roof deck, opposite the attic; and
    a thermal energy absorbing product (TEAP) that is a stand-alone product separate from but located between the roof deck and the roof product, the TEAP comprises a desiccant that reversibly absorbs moisture, and in response thereto heat is released and absorbed, respectively, by the desiccant to effect a thermal management of the roof system,
    the TEAP comprises a rigid sheet or a rigid panel, and the roof product is an asphaltic roof shingle; and a ventilation channel inside an interior of the TEAP adjacent the desiccant, whereby air having a humidity flowing through the ventilation channel transports moisture to and from the desiccant, and the heat released and absorbed by the desiccant effects thermal management of the roof system.

2. A roof system according to claim 1, wherein the desiccant comprises a powder or sheet form, and the desiccant comprises about 5 wt % to about 50 wt % of the TEAP.

3. A roof system according to claim 1, wherein the TEAP comprises a non-woven mat, glass mat, woven mat, scrim, felt, Kraft paper, honeycomb board, channeled panel, industrial fabric, recycled mat, porous ceramic board, cementitious board, wood composite, plastic wood, inorganic bonded composite, gypsum board, or any combination thereof, and the desiccant comprises media without an adhesive.

4. A roof system according to claim 1, further comprising a skin layer adjacent the desiccant, and the skin layer has a moisture permeability of greater than 2 perm.

5. A roof system according to claim 1, wherein the desiccant comprises clay, nano-clay, montmorillonite clay, synthetic zeolite, surface modified carbon, carbon molecular sieve, activated carbon, calcium oxide, calcium sulfate, salt, inorganic salt, silica gel, activated alumina, polymeric desiccant material, cellulose material, metal silicate, or any combination thereof.

6. A roof system according to claim 1, wherein the desiccant is a powder or in an encapsulated form with a size in a range of about U.S. mesh #10 to about U.S. mesh #325.

7. A roof system according to claim 1, wherein the TEAP is directly nailable for roofing shingles on top thereof without affecting an overall thickness and functionality of the TEAP, and the desiccant has a thickness in a range of about 0.25 inches to about 1 inch.

8. A roof system according to claim 1, further comprising at least one of a fire retardant, an anti-microbial addition, a UV stabilizer and a UV protection layer.

9. A roof system according to claim 8, wherein the desiccant and fire retardant form a unitary structure.

10. A roof system according to claim 9, wherein the unitary structure comprises less than about 25% of the fire retardant.

11. A roof system according to claim 8, wherein the fire retardant comprises at least one of expandable clay, expandable carbon black, expandable graphite, intumescent silicates, hydrated metal silicates, bromated compounds, halocarbons, aluminum hydroxide, magnesium hydroxide, hydromagnesite, antimony trioxide, various hydrates, red phosphorus, boron compounds and phosphonium salts.

12. A roof system according to claim 8, further comprising a skin layer having an uppermost layer and a lowermost layer, between which are located the desiccant.

13. A roof system according to claim 1, wherein the TEAP has an effective heat of absorption to regulate at least 5% of solar energy incident thereon.

14. A roof system according to claim 1, wherein the TEAP is flexible at a temperature of about 0° C., and remains structurally sound for a roof walkable surface at a roof surface temperature of about 70° C.

15. A roof system according to claim 1, wherein the desiccant has a heat of absorption of greater than about 20 kJ/mol-$H_2O$ to store solar heat during a heating cycle, and a thermal emittance of greater than about 0.70 that re-radiates stored heat during a cooling cycle.

16. A roof system according to claim 1, wherein the desiccant has a heat of absorption of less than about 70 kJ/mol-$H_2O$ to store solar heat during a heating cycle, and a heat absorbing range of about 10° C. to about 50° C.

17. A roof system according to claim 1, wherein the TEAP has a plurality of cells configured to be penetrated by roofing fasteners, and the cells are void of the desiccant.

18. A roof system according to claim 1, wherein the TEAP further comprises an upper radiant barrier and a lower moisture barrier, and components of the TEAP comprise the only materials located between the roof deck and the roof product.

19. A roof system according to claim 1, wherein the TEAP has a thickness of about 0.75 inches to about 2.5 inches.

20. A roof system according to claim 1, wherein the TEAP has a weight in a range of about 1 pound per square foot to about 10 pounds per square foot.

* * * * *